United States Patent [19]
Beach

[11] Patent Number: 5,133,631
[45] Date of Patent: Jul. 28, 1992

[54] SELF-LOCKING THREADED FASTENER

[75] Inventor: Verlin R. Beach, Lawrenceburg, Ind.

[73] Assignee: General Electric Company, Cincinnati, Ohio

[21] Appl. No.: 600,660

[22] Filed: Oct. 22, 1990

[51] Int. Cl.⁵ .................... F16B 39/34; F16B 39/04
[52] U.S. Cl. .................... 411/304; 411/294; 411/324; 411/909; 411/947
[58] Field of Search ............ 411/103, 106, 301–304, 411/324, 909, 947, 294, 296

[56] References Cited

U.S. PATENT DOCUMENTS

| | | |
|---|---|---|
| Re. 23,878 | 9/1954 | Burdick . |
| 2,462,603 | 2/1949 | Boots . |
| 2,539,887 | 1/1951 | Boots . |
| 2,585,621 | 2/1952 | Brandon . |
| 2,607,956 | 8/1952 | Brutus .................... 411/304 |
| 2,775,281 | 12/1956 | Smith . |
| 3,144,066 | 8/1964 | Van Hecke . |
| 3,269,443 | 8/1966 | Coyle .................... 411/304 |
| 3,416,823 | 12/1968 | Auer .................... 287/189.36 |
| 4,472,095 | 9/1984 | Molina .................... 411/304 |

FOREIGN PATENT DOCUMENTS

| | | | |
|---|---|---|---|
| 734443 | 5/1980 | U.S.S.R. | 411/909 |
| 734444 | 5/1980 | U.S.S.R. | 411/304 |
| 872817 | 10/1981 | U.S.S.R. | 411/103 |
| 1518576 | 10/1989 | U.S.S.R. | 411/909 |
| 372405 | 5/1932 | United Kingdom | 411/304 |

*Primary Examiner*—Neill R. Wilson
*Attorney, Agent, or Firm*—Jerome C. Squillaro; John R. Rafter

[57] ABSTRACT

This invention provides a temperature responsive self-locking fastener which includes a threaded shank and a threaded mating element both having approximately equal coefficients of thermal expansion and a temperature responsive locking member having a coefficient of thermal expansion different than that of the threaded shank and the mating element. The locking member expands relative to the threaded shank and the mating element at the operating temperature to prevent disengagement of the locking fastener. At the installation temperature, the locking fastener can be easily installed or removed even after one or more cycles between the operating and the installation temperature.

27 Claims, 7 Drawing Sheets

SELF-LOCKING THREADED FASTENER

FIELD OF THE INVENTION

This invention relates to gas turbine engines and, more particularly, to locking fasteners that function in extremes of vibration and temperature.

BACKGROUND OF THE INVENTION

Previous approaches to the problem of preventing threaded fasteners from loosening during high vibrational loading incorporate high thread friction or an external locking device. High thread friction can be achieved by a plastic material that compresses when the fastener is screwed together. Alternately, a thread distortion technique can be used to force the threads to interfere with one another in response to an axial force causing a high frictional load to develop during installation. However, neither approach works well when the temperature environment changes from the installation temperature. As the temperature rises, high thread friction can cause an irreversible metal to metal lock or weld to occur. The plastic material approach similarly is limited in high temperature applications because plastic can deteriorate and deform in response to temperature increases. As the temperature decreases, frictional loading of the threads generated during installation may decrease which would allow the fastener to loosen when vibrated. Plastic materials harden and may become brittle. Failures occur when the plastic breaks or looses its frictional hold on the elements of the fastener. Both approaches wear easily and exhibit a limited life after several installation and removal cycles.

An external locking device approach requires the installation of a locking member and thus requires an unobstructed access to the fastener. Sometimes the locking device is a complicated mechanism and special tools and training for proper installation and removal may be required to properly install the device in order to be effective. This type of locking mechanism cannot be used in many otherwise desirable locations such as on a gas turbine engine where access is limited.

Accordingly, it is an object of this invention to provide a self-locking threaded fastener for a gas turbine engine that employs a temperature responsive locking member that prevents the threaded shank and a threaded mating element from disengaging from each other when exposed to vibration and temperature extremes.

It is a further object of the present invention to provide a wear resistant fastener which is capable of many installation and removal cycles.

It is a further object to provide a fastener which can be used in areas of limited access without special tools.

It is also desirable to provide a fastener which and can be retrofitted on existing gas turbine engines.

SUMMARY OF THE INVENTION

In carrying out this invention, in one form thereof, a self-locking threaded fastener is provided for a gas turbine engine that includes a temperature responsive locking member, a threaded shank having an opening located along its axis for receiving the locking member and a threaded mating element. The threaded shank exhibits a coefficient of thermal expansion, TC1, and the mating element exhibits a coefficient of thermal expansion, TC2, while the locking member exhibits a coefficient of thermal expansion, TC3. As the temperature changes, there is expansion of the locking member relative to the shank and the mating element. In preferred embodiments, TC1 and TC2 are approximately equal while TC3 is greater than both TC1 and TC2 for high temperature operation and TC3 is lower than both TC1 and TC2 for low temperature operation. In high temperature applications, the operational temperature is higher than the installation temperature and the locking element expands more than the shank and mating element causing the locking element to increase in size relative to the shank and the mating element. In low temperature operation, the operational temperature is lower than the installation temperature and the shank and mating element shrink more than the locking member causing an apparent increase in size of the locking member relative to the shank and mating element. The opening along the axis of the threaded shank can be a hole either partially or completely through the shank or it can be a circumferential groove partially around the axis of the shank.

The locking function prevents axial or rotational movement of the shank relative to the mating element by producing frictional forces between the locking member and the mating element or by positive interaction between the locking member and a notch or a hole in the mating element designed to receive it. A frictional lock occurs when the relative expansion of the locking member is restrained by the mating element. The greater the temperature change that occurs, the greater the restraint and the higher the frictional forces are developed. An appropriate selection of materials and a knowledge of the temperature environment allows a fastener to meet the needs of a design. For instance, in a gas turbine engine environment, various locking forces are desirable because different vibrational frequencies and amplitudes exist and different frictional locking forces are required to ensure that the threaded shank and mating element will not disengage during operation.

Positive interaction between the locking members is achieved when the locking member expands into a notch or a hole in the mating element designed to receive it. Such a structure avoids creating additional stress in the mating element while still preventing disengagement of the threaded shank. Disengagement is prevented by abutment of the locking member and the notch which restricts axial movement of the threaded shank relative to the mating element, rotational movement of the threaded shank relative to the mating element or both.

One use of the locking fastener in a gas turbine engine is as a plug for a borescope hole. Those familiar with gas turbine technology are aware that in order to inspect interior parts of the engine without complete disassembly, an optical instrument, called a borescope, is inserted into the engine through a hole for visual inspection. Upon removal of the borescope, the hole is closed with a borescope plug. High temperatures and vibrational stresses present in a gas turbine engine sometimes cause the borescope plug to loosen and fall out, thereby degrading engine performance. Use of the present invention can help prevent the loss or loosening of borescope plugs or other threaded fasteners in a gas turbine engine.

In one embodiment of this invention, a locking member is disposed in an axially located radial hole that extends through the shank and is threaded on both ends such that at the installation temperature the shank and locking member form a continuous set of threads along the threaded portion of the shank. At the operating temperature, the threaded locking member expands to frictionally engage the mating element. The threaded locking member is pinned near or at its center to prevent it from falling out during installation.

In a modified form of the invention, the locking member forms a split ring and is recessed in a circumferential groove, extending less than 360° around the shank, having two ends and is axially located in an unthreaded portion of the shank, usually in the upper half of its length, and is in a plane perpendicular to the axis of the shank. The locking member expands at the operating temperature and frictionally engages an unthreaded section of the mating element. The locking member is coupled to the shank by end abutment between the locking member and the two ends of the circumferential groove. The locking member can be bimetallic or nonmetallic. A bimetallic locking member will expand further per degree change in temperature than a single material and can be used when a greater temperature response is desired.

In another modified form of this invention, the locking member is recessed in a hole that extends partially through a threaded shank and is axially located and radially disposed in an unthreaded portion of the shank, usually in the upper half of its length, and is nearly perpendicular to the axis of the shank. At the operating temperature, it expands to frictionally engage an unthreaded section of the mating element thereby locking the shank to the mating element.

Positive interaction between the locking member and the mating element occurs when the locking member engages a hole or circumferential notch in the mating element designed to receive it. As the temperature changes, the relative expansion of the locking member causes the locking member to engage the notch or hole in the mating element that is designed to prevent either axial or rotational movement of the shank relative to the mating element. Either type of restraint will prevent disengagement of the shank from the mating element during vibrational loading at the operating temperatures.

In accordance with another modified form of the invention, a locking member is circumferentially recessed in a groove, extending less than 360° around the shank, having two ends and is axially located in an unthreaded portion of the shank, usually in the upper half of its length, where at the operating temperature it engages a 360° circumferential notch in the mating element. Relative expansion of the locking member is not restrained but prevents axial disengagement of the shank from the mating element by axial abutment of both the shank and the mating element with the locking member.

In accordance with another modified form of the invention, a locking member is recessed in a hole that is axially located and radially disposed from the axis of the shank where it expands at the operating temperature to engage a hole in the mating element. Engagement of the locking member with the hole prevents both axial and radial movement of the shank relative to the mating element by axial and circumferential abutment of both the shank and the mating element with the locking member.

In the embodiments described herein, additional locking members can be added to tailor the locking requirements to the particular locking fastener application. Any second or more locking element may exhibit a coefficient of thermal expansion, TC4, that is different than any other locking member and may be either higher or lower than TC1, TC2 to accommodate an application that experiences temperature extremes both above and below the installation temperature and may be higher or lower than or equal to TC3 to accommodate an application that requires a more tailored thermal response.

The threaded shank described in the embodiments herein may be part of a nut and bolt arrangement or may be a threaded stud and mating threaded hole. The nut has a head that is larger in cross section than the threaded shank and is integrally attached to it. The nut and bolt arrangement is used to connect two external structures together. The threaded stud usually has a uniform cross section and requires both a threaded mating hole in one structure and a nut to join two structures together.

BRIEF DESCRIPTION OF THE DRAWINGS

A more complete understanding of the invention may be had from the following detailed description when taken in conjunction with the accompanying drawings in which.

DESCRIPTION OF THE PREFERRED EMBODIMENT

Figure 1:
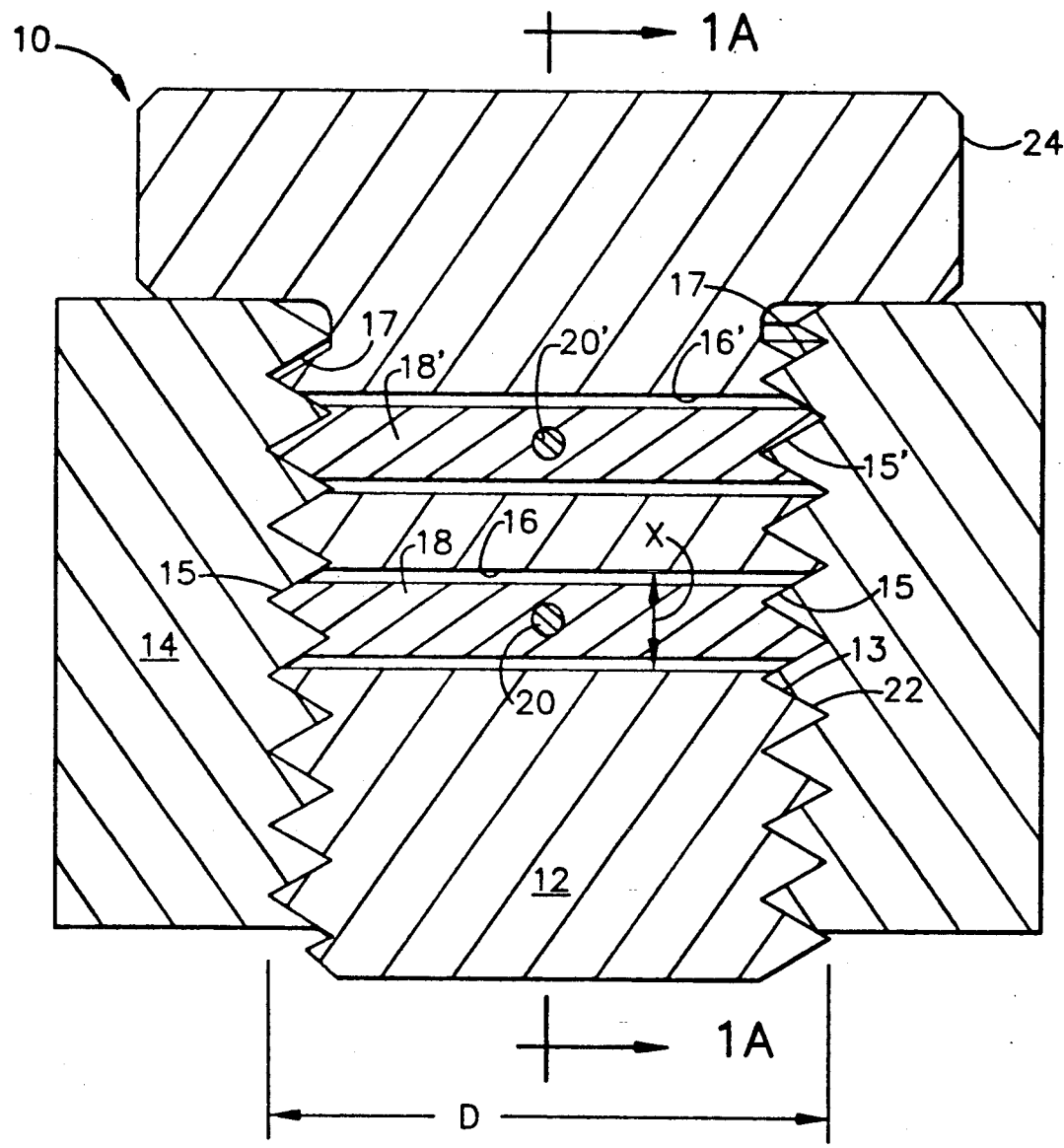
FIGS. 1 and 1A are illustrations of an axial cross sections of a threaded locking fastener in accordance with one embodiment of the present invention.
Figure 1A:
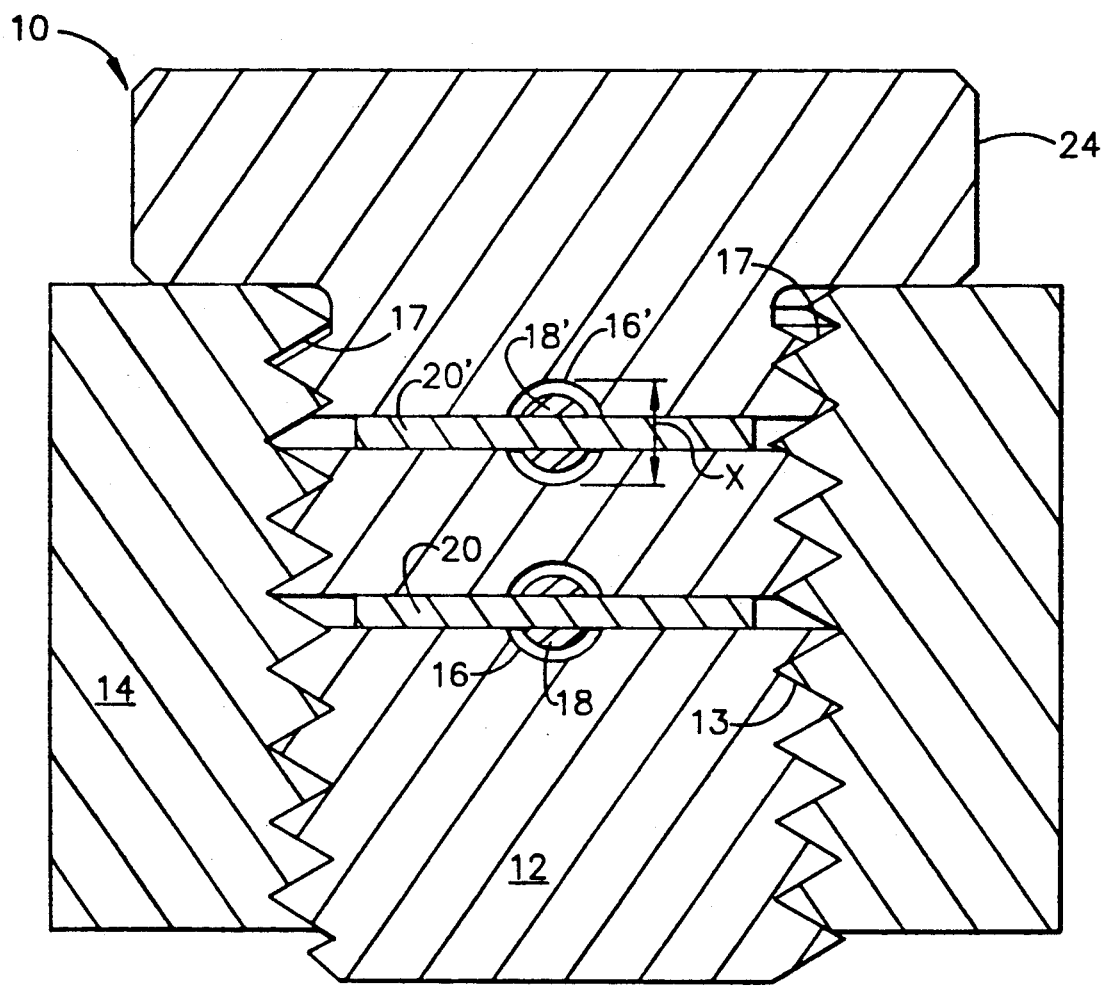

Referring now to the figures wherein like reference numerals have been used throughout to designate like parts, there is shown in FIGS. 1 and 1A an illustration of two cross sections embodying a threaded locking fastener 10. As shown there, the threaded locking fastener 10 includes a shank 12, having a coefficient of thermal expansion TC1. A threaded mating element 14 having threads 17 with a coefficient of thermal expansion TC2 is also shown. A recessed locking member 18 is located in a radial through hole 16 and has threads 15 at each end and a coefficient of thermal expansion TC3. The locking fastener is prevented from falling out during installation by pin 20. The threaded shank 12, as shown, has an integral head 24 having a cross-sectional area larger than the cross-sectional area of the threaded shank 12 but can be used without the integral head 24 and is called a stud or plug when so used.

At the installation temperature which is usually room temperature, the shank threads 13 and the locking member threads 15 form an integral and substantially uniform uninterrupted thread along the thread line of the threaded shank 12 that engages the threads 17 of the mating element. This feature facilitates installation and removal of the fastener 10. At an operating temperature that is different than the installation temperature, it is preferred that the fastener undergo a thermal reaction wherein the locking member 18 expands relative to both the threaded shank 12 and the mating element 14 because TC3 is either larger than TC1 and TC2 in a high temperature application or is smaller than TC1 and TC2 for a low temperature environment. The relative expansion of the locking member 18 is restrained by the mating element 14 causing a frictional force there between to be developed. The frictional force occurring between the mating threads 15 and 17 is communicated to the threaded shank 12 through circumferential abutment of the locking member 18 and the radially disposed through hole 16. This embodiment prevents rotational movement of the threaded shank 12 relative to the mating element 14. The locking element has a diameter, X, which is selected to obtain a desired frictional force and usually is less than one half the shank diameter, D.

Figure 2:
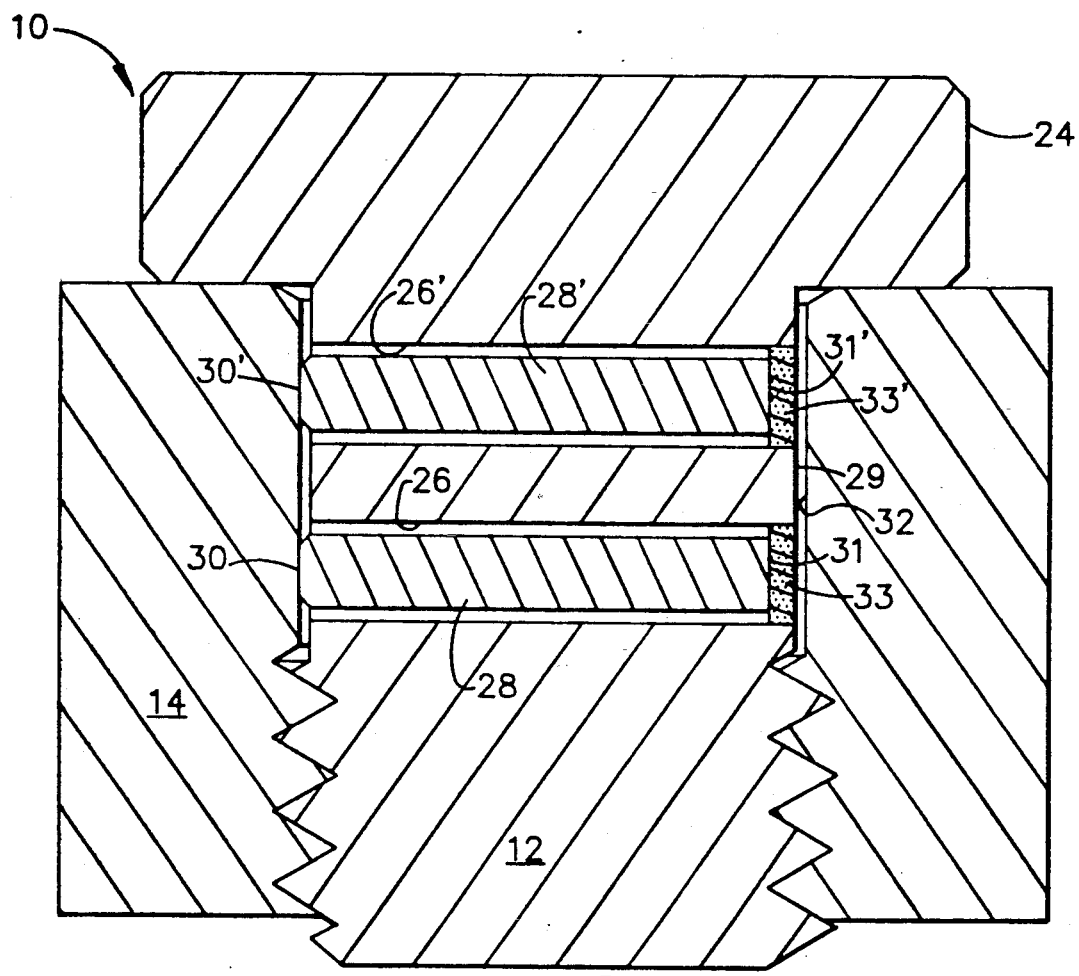
FIG. 2 is an illustration of an axial cross section of a threaded locking fastener of another embodiment of the present invention.

FIG. 2 shows another embodiment of the invention comprising a partially threaded shank 12 having an unthreaded portion 29, a partially threaded mating element 14 having an unthreaded portion 32 which lies adjacent the unthreaded shank portion 29 when installed, and a radially disposed locking member 28 having a radially distal end 30 and radially medial end 31. As shown there, the locking member 28 is disposed in a radial hole 26 formed partially through the unthreaded section 29 of the threaded shank 12 and having a bottom 33. At the installation temperature, distal end 30 is nearly flush with the surface of the unthreaded section 29 to facilitate installation and removal. At the operating temperature, the locking member 28 expands in the radial direction relative to both the threaded shank 12 and the mating element 14 causing the locking member 28 to be restrained between the mating element 14 and the hole bottom 33. The restraint causes a frictional force to be developed between the locking member 28 and the unthreaded portion of the mating element 32. The frictional force prevents rotation of the threaded shank 12 relative to the mating element 14 through circumferential abutment of the locking member 28 and the radial hole 26. Mating element 28 is prevented from falling out during installation by a braze or other similar process at its medial end 31.

Figure 3:
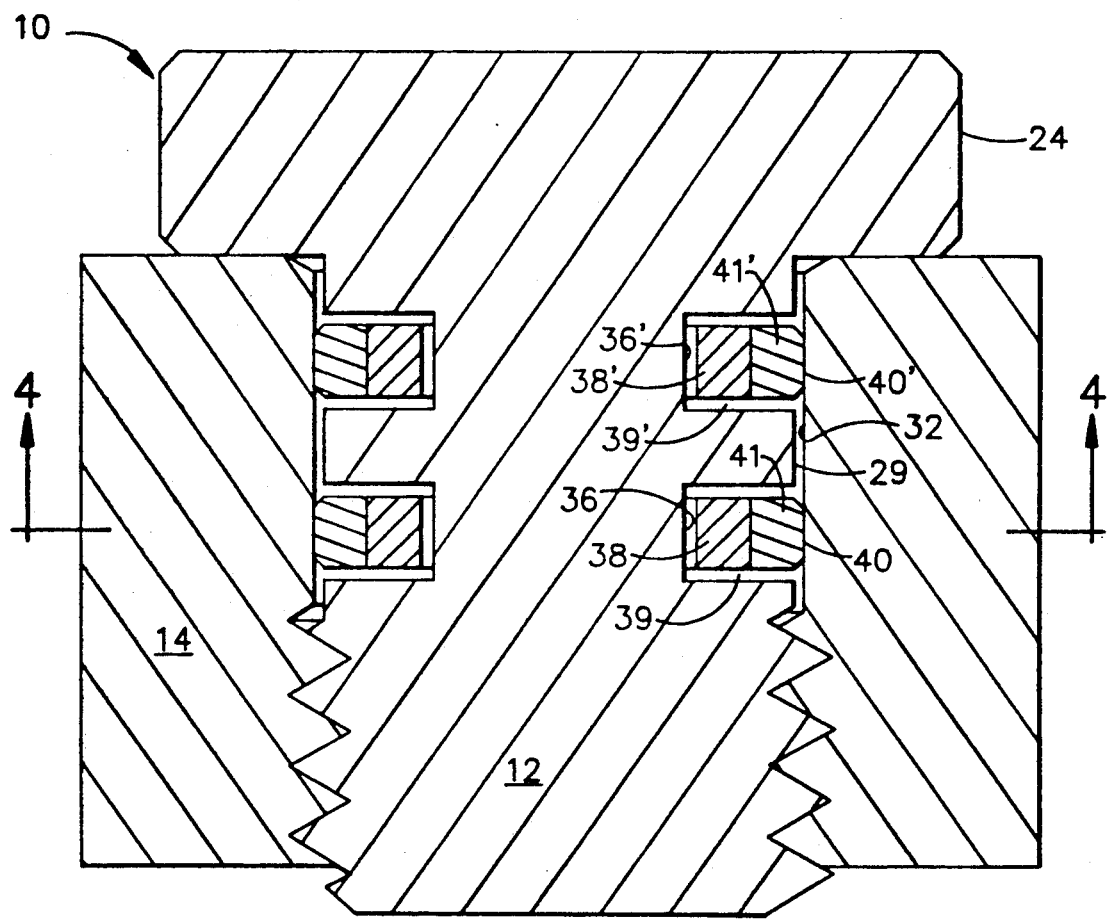
FIGS. 3 and 4 are illustrations of an axial and a radial cross section, respectively, of a threaded locking fastener of a still further embodiment of the present invention.
Figure 4:
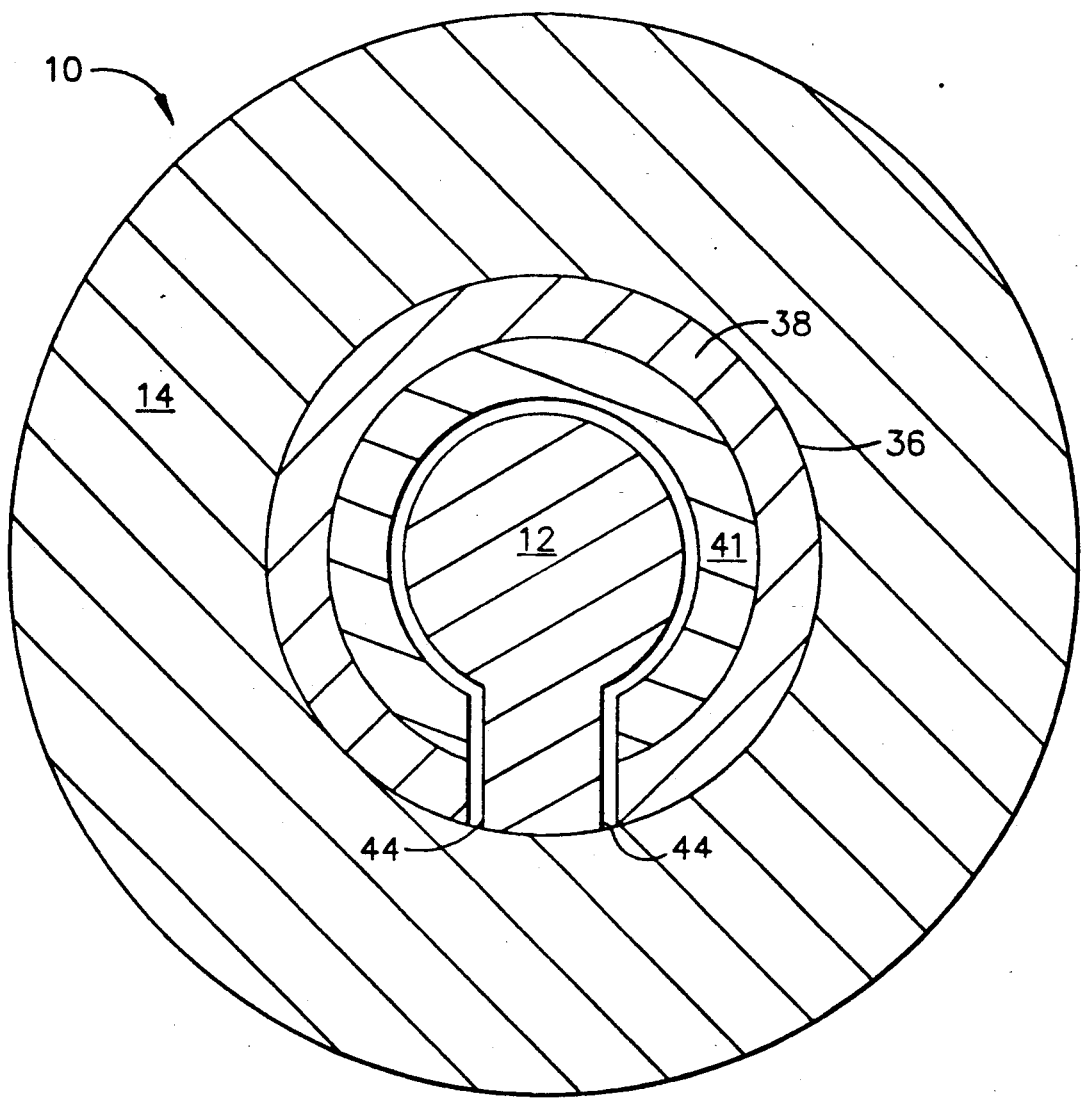

In another embodiment of the invention as illustrated in FIGS. 3 and 4, a recessed locking member 38 is circumferentially disposed in an axially located groove 36 having ends 44 that is circumferentially disposed less than 360 around an unthreaded portion 29 of a partially threaded shank 12. The locking member 38 forms a split ring that at the installation temperature, is nearly flush with the unthreaded portion 29 of the shank 12 which facilitates installation and removal. At the operating temperature, the locking member 38 undergoes relative expansion compared to the shank 12 and the mating element 14. Expansion of the locking member 38 is restrained by the mating element 14 and causes it to frictionally engage the unthreaded portion 32 of the mating element 14. The shank 12 is prevented from rotation by the circumferential abutment of groove ends 44 and the locking member 38. The frictional engagement of the locking member 38, coupled with its abutment of the ends 44 of groove 36, prevents the threaded shaft 12 from rotating relative to the mating element 14. The locking element has a height, X, which is selected to obtain a desired frictional force and usually is less than one half the shank diameter, D.

Figure 5:
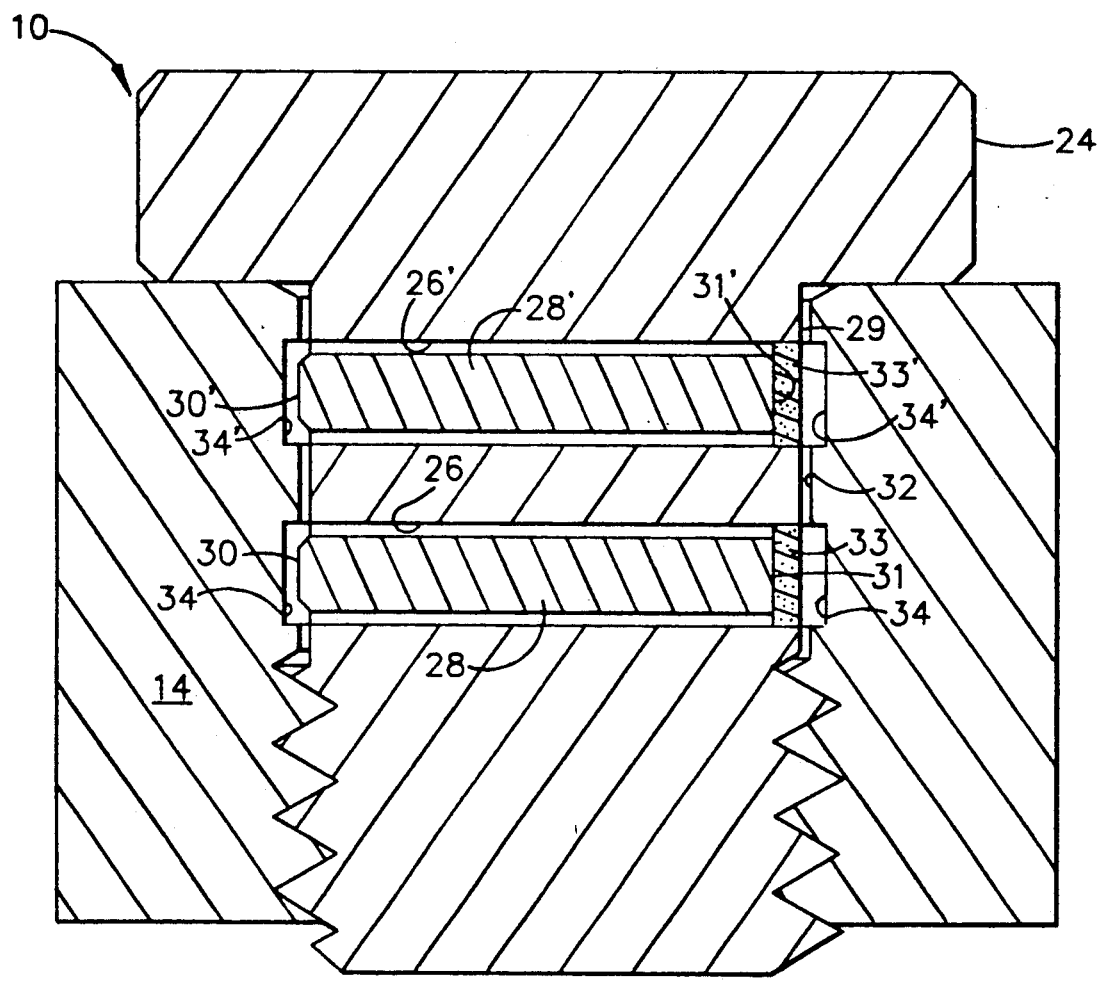
FIG. 5 is an illustration of an axial cross section of a threaded locking fastener of a still further embodiment of the present invention.
Figure 6:
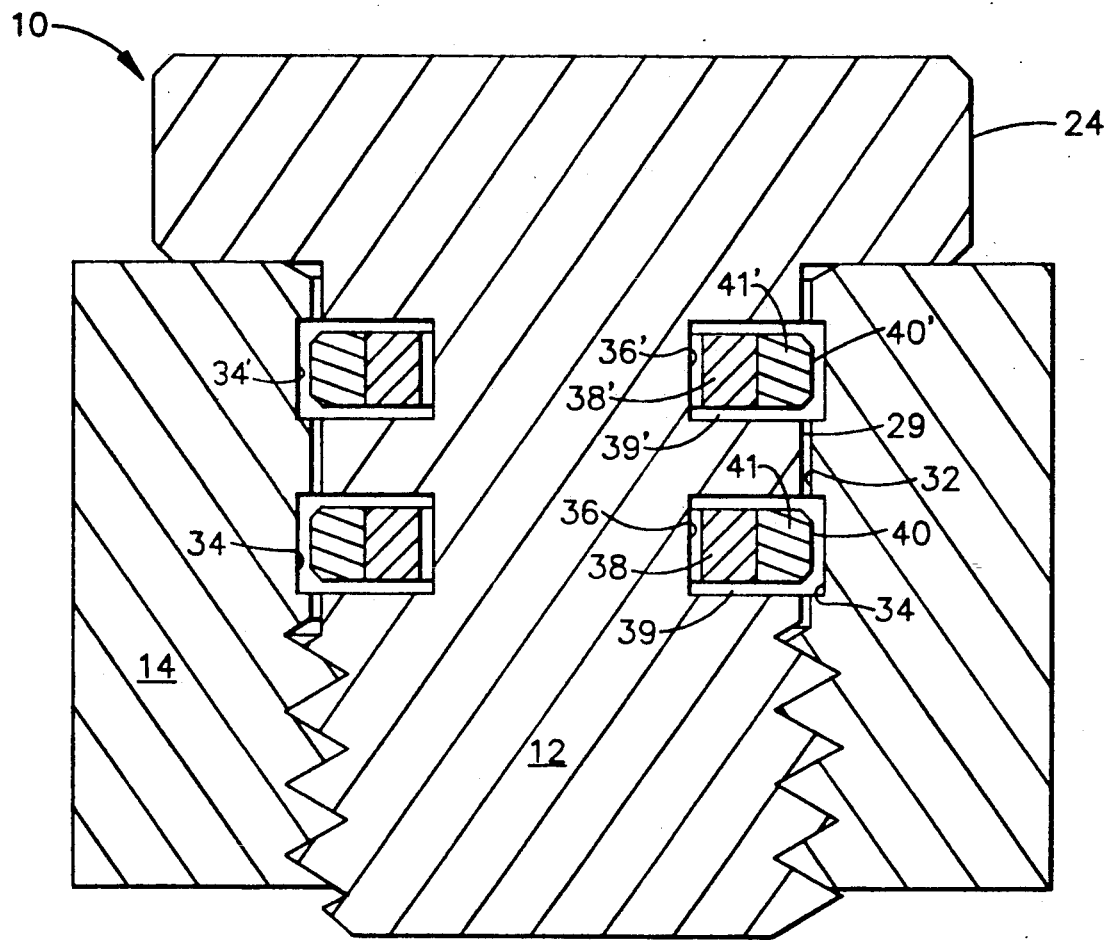
FIG. 6 is an illustration of an axial cross section of a threaded locking fastener of a still further embodiment of the present invention.

Alternate embodiments of the invention that incorporate a 360° notch to couple a threaded shank 12 and a mating element 14 are illustrated in FIGS. 5 and 6. Each embodiment employs a locking member 28 and 38 respectively that expands to engage a notch 34 to prevent disengagement of the threaded shaft 12 from the mating element 14. FIG. 5 shows a radially disposed locking member 28, identical to the one described in FIG. 2, and notch 34 in the mating element 14 that is axially located to receive it. The notch 34 and the locking member 28 may be located in a threaded or an unthreaded section of the mating element 14 and the shank 12. At the installation temperature, the locking member 28 is nearly flush with the threaded shank 12 to facilitate installation and removal. At the operating temperature, the locking member 28 radially expands relative to the threaded shank 12 and the mating element 14 to engage the notch 34. The threaded shank 12 and mating element 14 are prevented from disengagement by axial abutment of the elongated locking member 28 and the notch 34.

FIG. 6 shows locking member 38 circumferentially disposed in a groove 36, identical to the one described in FIG. 3, and a 360° circumferential notch 34 that is axially located to receive the locking member 38. At the installation temperature, the locking member 38 is nearly flush with an unthreaded portion of the threaded shank 12 to facilitate installation and removal. At the operating temperature, the locking member 38 expands radially relative to the threaded shank 12 and the mating element 14 to engage the circumferential notch 34. The threaded shank 12 is prevented from disengagement by axial abutment of the expanded locking member 38 with both the groove 36 and the circumferential notch 34. A locking member as shown at 41 may be bimetallic and contain a second material that has a different coefficient of thermal expansion than the first material. As is well known, the bimetallic locking member 41 will deflect farther for a given change in temperature than the single material locking member 38.

In the embodiments described herein, frictional locking forces are a function of the locking member diameter and thickness or length, the number of locking members, the coefficients of friction, the coefficients of thermal expansion, and the change in temperature between installation and operating conditions. The dimensions, physical characteristics, and number of the locking elements may be selected to achieve any required frictional locking force necessary to resist disengagement of the locking fastener.

The amount of additional expansion the locking member experiences over and above the amount of expansion of the shank and its mating element experience at a given temperature is a function of the relative difference in their coefficients of thermal expansion. In a gas turbine engine, the coefficients of thermal expansion for the shank, the mating element and the locking member, TC1, TC2 and TC3, respectively, preferably range from $2.0 \times 10^{-6}/°F$ to $30.0 \times 10^{-6}/°F$. For proper operation in most applications, it is preferred that the coefficient of thermal expansion of the locking member, TC3, differ from that of the threaded shank, TC1, and the mating element, TC2, by a minimum of $3 \times 10^{-6}/°F$.

It is preferred that the installation and removal temperature for the locking fastener of the present invention be an ambient or a non-operational temperature for a gas turbine engine and it is preferred that such a temperature be between 30° F. and 110° F. An operational temperature is a steady-state, equilibrium temperature that the locking fastener experiences during engine operation and typically ranges between −60° F. and 2500° F. depending on the specific application. These temperature ranges correspond roughly to the varied air temperatures that gas turbine engine parts might be exposed to during engine maintenance or operation in various parts of the world.

It will be apparent to those skilled in the art upon consideration of the foregoing specification and drawings, that numerous modifications can be easily made without departing from the true spirit and scope of the present invention; and thus the invention is broader than the exact constructions shown and described and these features are only illustrations of the preferred embodiment of the invention; and suitable modifications and equivalents may be used and fall within the scope of the appended claims.

I claim:

1. A temperature responsive self-locking fastener for use in a gas turbine engine whose operating temperature is different than its installation temperature comprising;
    a threaded shank having a first coefficient of thermal expansion, TC1, and an opening for receiving a locking member;
    a threaded mating element for receiving said shank and having a second coefficient of thermal expansion, TC2, that is approximately equal to said first coefficient of thermal expansion;
    a temperature responsive locking member disposed in said shank opening and having a third coefficient of thermal expansion, TC3, wherein TC3 is not equal to either said first or said second coefficient of thermal expansion;
    wherein at said installation temperature, said locking member is unlocked, thereby minimizing wear and tear on said locking member during installation or removal, and at said operating temperature said locking member prevents disengagement of said threaded shank and said mating element.

2. A temperature responsive self-locking fastener as described in claim 1 wherein said threaded shank is disposed along an axis and having a first cross-sectional area, a first and a second end and a head with a second cross-sectional area that is perpendicular to said axis and integrally attached to said first end, wherein said second cross-sectional area is larger than said first cross-sectional area.

3. A temperature responsive self-locking fastener as described in claim 1 wherein said threaded shank is axially divided into an unthreaded upper half and a threaded lower half and said locking member is axially located along said unthreaded upper half.

4. A temperature responsive self-locking fastener, as described in claim 1, including a plurality of locking members, each having a different coefficient of thermal expansion.

5. A temperature responsive self-locking fastener as described in claim 1, wherein said threaded shank has a diameter, D, and said locking member has a diameter or thickness, X, wherein the ratio of X to D is less than 0.5.

6. A temperature responsive self-locking fastener as described in claim 1, wherein said first, said second and said third coefficients of thermal expansion are between $2.0 \times 10^{-6}/°F.$ and $30.0 \times 10^{-6}/°F.$ 7. A temperature responsive self-locking fastener as described in claim 1, wherein said difference between said first or said second coefficient of thermal expansion and said third coefficient of thermal expansion is larger than $3.0 \times 10^{-6}/°F.$ 8. A temperature responsive self-locking fastener as described in claim 1, wherein said locking member and said mating element form removable engagement at a temperature below 110° F. and form locked, substantially vibration resistant engagement, at a temperature above 160° F.

9. A temperature responsive self-locking fastener as described in claim 1, wherein said locking member and said mating element form removable engagement at a temperature above 30° F. and form locked, substantially vibration resistant engagement, at a temperature below 10° F.

10. A temperature responsive self-locking fastener as described in claim 1, wherein said locking member develops a locking force between said locking member and said mating element that exceeds 50 pounds.

11. A temperature responsive self-locking fastener as described in claim 10 wherein said locking force is developed by friction between said locking member and said mating element.

12. A temperature responsive self-locking fastener for use in a gas turbine engine whose operating temperature is different than its installation temperature comprising:
    a) a threaded shank having a first coefficient of thermal expansion, TC1, and an opening for receiving a locking member;
    b) a threaded mating element for receiving said shank, having a second coefficient of thermal expansion, TC2, that is approximately equal to said first coefficient of thermal expansion and having a notch or a hole; and
    c) a temperature responsive locking member disposed in said shank opening and having a third coefficient of thermal expansion, TC3, wherein TC3 is not equal to either said first or said second coefficient of thermal expansion wherein said locking member engages said notch or said hole when said self-locking fastener is at said operating temperature.

13. A temperature responsive self-locking fastener as described in claim 12, wherein said engagement prevents rotational movement of said threaded shank relative to said mating element.

14. A temperature responsive self-locking fastener as described in claim 12, wherein said engagement prevents axial movement of said threaded shank relative to said mating element.

15. A temperature responsive self-locking fastener as described in claim 12, wherein said engagement prevents axial and rotational movement of said threaded shank relative to said mating element.

16. A temperature responsive self-locking fastener as described in claim 12, wherein said threaded shank includes a plurality of openings each for receiving a locking member;
    wherein said threaded mating element includes a plurality of notches or holes; and
    a plurality of temperature responsive locking members each having a coefficient of thermal expansion different from each other and different from TC1 and TC2 and being disposed in said plurality of shank openings wherein at least one of said temperature responsive locking members engages one of said notches or said holes when said self-locking fastener is at said operating temperature.

17. A temperature responsive self-locking fastener as described in claim 1, wherein said locking member is situated in an axially located and circumferentially disposed groove.

18. A temperature responsive self-locking fastener as described in claim 1, wherein said locking member is axially located and circumferentially disposed in a groove around said threaded shank.

19. A temperature responsive self-locking fastener as described in claim 1, wherein said locking member is axially located and circumferentially disposed in a groove that is less than 360° around said threaded shank.

20. A temperature responsive self-locking fastener as described in claim 1, wherein said locking member is situated in an axially located and radially disposed hole in said threaded shank.

21. A temperature responsive self-locking fastener as described in claim 1, wherein said locking member is bimetallic.

22. A temperature responsive self-locking fastener as described in claim 1, wherein the material for said locking member is metallic.

23. A temperature responsive self-locking fastener as described in claim 1, wherein the material for said threaded shank and said mating element is metallic.

24. A temperature responsive self-locking fastener as described in claim 1, including means for coupling said threaded shank and said locking member.

25. A temperature responsive self-locking fastener for use in a gas turbine engine whose operating temperature is different than its installation temperature comprising:
  a threaded shank having a first coefficient of thermal expansion, TC1, and an axially located and radially disposed hole;
  a threaded mating element for receiving said shank and having a second coefficient of thermal expansion, TC2, that is approximately equal to said first coefficient of thermal expansion;
  a temperature responsive locking member disposed in said shank hole and having a set of threads that, at an installation temperature, are continuous with said threads formed on said shank and, at an operating temperature, said locking member expands relative to said threaded shank and said mating element and develops a frictional force between said locking member and said mating element, thereby preventing disengagement of said threaded shank and said mating element; wherein at said installation temperature, said locking member is unlocked thereby minimizing wear and tear on said locking member and thereby maximizing the number of installation and removal cycles of said self-locking fastener.

26. A temperature responsive self-locking fastener as described in claim 25 including a plurality of locking members, each having a different coefficient of thermal expansion.

27. A temperature responsive self-locking fastener for use in a gas turbine engine whose operating temperature is different from its installation temperature comprising:
  a) a threaded shank having a first coefficient of thermal expansion, TC1, and a plurality of axially located and radially disposed holes;
  b) a threaded mating element for receiving said shank, having a second coefficient of thermal expansion, TC2, that is approximately equal to said first coefficient of thermal expansion; and
  c) a plurality of temperature responsive locking members each having a coefficient of thermal expansion that is different from each other and different from TC1 and TC2 and being disposed in said plurality of shank holes and each having a set of threads that, at an installation temperature, are continuous with said threads formed on said shank and, at an operating temperature, at least one of said locking members expands relative to said threaded shank and said mating element and develops a frictional force between said locking member and said mating element, thereby preventing disengagement of said threaded shank and said mating element.

* * * * *